United States Patent Office 3,387,039
Patented June 4, 1968

3,387,039
PREPARATION OF DISULFIDES
Richard C. Doss, Bartlesville, Okla., assignor to Phillips Petroleum Company, a corporation of Delaware
No Drawing. Filed Apr. 8, 1965, Ser. No. 446,744
3 Claims. (Cl. 260—608)

ABSTRACT OF THE DISCLOSURE

An organic disulfide is prepared by contacting a thiol such as 1-butanethiol with a mixture of an alpha-halo aldehyde such as chloroacetaldehyde and an alkyl sulfoxide such as methyl sulfoxide.

---

This invention relates to a method for preparing organic disulfides.

Heretofore organic disulfides have been prepared by oxidizing thiols with a chemical oxidizing agent. However, a problem with certain of these processes has been that significant amounts of the thiol used or the disulfide formed or both have been consumed in side reactions which yield undesired by-products and lower the overall yield of the desired disulfide.

Surprisingly, it has been found that the consumption of the thiol or disulfide or both by side reactions is reduced and the production of the disulfide improved if the thiol is contacted with a mixture of an alpha-halo aldehyde and an alkyl sulfoxide.

Accordingly, it is an object of this invention to provide a new and improved method for preparing an organic disulfide.

Other objects, aspects and the several advantages of the invention will be readily apparent to those skilled in the art from the description and the appended claims.

In accordance with this invention, an organic disulfide having the formula RSSR is prepared by the oxidation of a thiol of the formula RSH with a mixture of an alpha-halo aldehyde of the formula $XCR'_2CHO$ and an alkyl sulfoxide of the formula $R''_2SO$, where R is a monovalent hydrocarbon radical selected from the group consisting of alkyl, alkenyl, cycloalkyl, cycloalkenyl, aryl, and combinations thereof such as alkaryl, aralkyl, and the like, preferably alkyl and alkenyl, containing up to and including 16 carbon atoms, preferably from 1 to 10, still more preferably containing from 1 to 6, carbon atoms, inclusive; R' is at least one member selected from the group consisting of hydrogen, alkyl radicals, cycloalkyl radicals, aryl radicals, and combinations thereof such as alkaryl, aralkyl, and the like, preferably hydrogen and alkyl radicals, containing from 1 to 8 carbon atoms, preferably from 1 to 3 carbon atoms, inclusive; R'' is at least one alkyl radical selected from the group consisting of primary and secondary radicals which contains from 1 to 6, preferably 1 to 4, carbon atoms, inclusive, still more preferably being a member selected from the group consisting of methyl, ethyl, propyl and isopropyl; and X is a halogen, preferably selected from the group consisting of chlorine and bromine.

As examples illustrative of the process of this invention, ethyl disulfide is produced by the oxidation of ethanethiol with a mixture of chloroacetaldehyde and methyl sulfoxide, and phenyl disulfide is produced by the oxidation of benzenethiol with a mixture of 2-bromopropionaldehyde and ethyl sulfoxide.

Examples of some disulfides that can be prepared by the method of this invention are methyl disulfide, ethyl disulfide, propyl disulfide, isopropyl disulfide, butyl disulfide, sec-butyl disulfide, 1-methylpentyl disulfide, 1-ethylhexyl disulfide, decyl disulfide, 1-methyl-3-ethylnonyl disulfide, hexadecyl disulfide, allyl disulfide, 1-methyl-3-pentenyl disulfide, cyclohexyl disulfide, 3-methylcyclopentyl disulfide, cyclopentylmethyl disulfide, 3-cyclohexen-1-yl disulfide, 2-cycloocten-1-yl disulfide, phenyl disulfide, o-tolyl disulfide, and benzyl disulfide.

Generally, any thiol satisfying the above general description thereof can be employed in this invention. Examples of such thiols are methanethiol, ethanethiol, 1-propanethiol, 2-propanethiol, 1-butanethiol, 2-butanethiol, 2-hexanethiol, 3-octanethiol, 1-decanethiol, 4-ethyl-2-decanethiol, 1-hexadecanethiol, 2-propene-1-thiol, 4-hexene-2-thiol, cyclohexanethiol, 3-methylcyclopentanethiol, cyclopentanemethanethiol, 3-cyclohexene-1-thiol, 2-cyclooctene-1-thiol, benezenethiol, p-toluenethiol, and α-toluenethiol.

Also, any halo aldehyde satisfying the above description can be employed in this invention. Examples of such halo aldehydes are fluoroacetaldehyde, chloroacetaldehyde, bromoacetaldehyde, iodoacetaldehyde, 2-chloropropionaldehyde, 2-iodobutyraldehyde, 2-bromovaleraldehyde, 2-propyl-2-chlorovaleraldehyde, 2-fluorohexanal, 2-iodooctanal, 2-bromo-4-methylnonanal, 2-octyl-2-chlorodecanal, cyclopentylchloroacetaldehyde, 2-bromo-3-cyclohexylpropionaldehyde, phenylbromoacetaldehyde, 2-chloro-3-phenylpropionaldehyde, and p-tolylchloroacetaldehyde.

Further, any alkyl sulfoxide satisfying the above description can be employed. Examples of such sulfoxides are methyl sulfoxide, ethyl sulfoxide, propyl sulfoxide, isopropyl sulfoxide, butyl sulfoxide, isobutyl sulfoxide, sec-butyl sulfoxide, pentyl sulfoxide, hexyl sulfoxide, methyl ethyl sulfoxide, methyl butyl sulfoxide, ethyl propyl sulfoxide, and butyl hexyl sulfoxide.

Although the reactants can be employed over a wide range of ratios, the molar ratio of the thiol to the alpha-halo aldehyde will usually be within the range of from about 1:1 to about 10:1, preferably from about 2:1 to about 6:1. The alkyl sulfoxide, which serves as a solvent as well as being an essential component in effecting the desired reaction of the invention, can be employed in widely varying amounts. Generally, an amount of alkyl sulfoxide effective for achieving the desired reaction is employed; preferably, this amount is at least 50 weight percent based on the total weight of the starting materials. Additional minor amounts of extraneous solvents which are inert with the reactants or other components used or produced in the system can be employed. Such solvents include ether, hexane, cyclohexane, benzene, and the like.

Although the reaction time can vary over a wide range, depending upon the reactivity of the particular reactants and the temperature employed, it will generally be within the range of from about 1 minute to about 24 hours, preferably from about 5 minutes to about 6 hours. The reaction temperature itself also depends on the nature of the reactants and will therefore also vary over a wide range, but will generally be within the range of from about 0 to about 200° C., preferably from about 20 to about 100° C. The reaction pressure, too, will vary over a wide range depending upon the reactants, solvents and reaction temperature, but will generally be that sufficient to maintain the reactants substantially in the liquid phase, although higher pressures can be employed if desired.

The disulfides produced by this invention are conveniently separated from the reaction mixtures by conventional procedures such as dilution with water followed by extraction with ether and distillation.

Mixtures of disulfides, both symmetrical and unsymmetrical, can be made according to this invention by employing mixtures of thiols. For example, when methane- and ethanethiols are employed a mixture of methyl disulfide (symmetrical), ethyl disulfide (symmetrical) and methyl ethyl disulfide (unsymmetrical) can be formed.

The disulfides of this invention can be utilized as agricultural chemicals or as intermediates in the production of agricultural and other chemicals. Those disulfides having olefinic unsaturation are useful as monomers or as additives in the production of polymers. Other uses include employment in lubricating or cutting oils, as antioxidants, to improve detergent action and to prevent or inhibit sludge formation or corrosion. Butyl disulfide is a catalyst for the addition of thioacetic acid to vinyl fluoride and allyl disulfide is used to prevent injury to films by heat and light. Propyl disulfide is a stabilizer for pure hydrocarbons while aromatic disulfides are stabilizers for photographic emulsions.

EXAMPLE I

To 250 ml. of methyl sulfoxide were added 37 grams of 70 weight percent anhydrous chloroacetaldehyde containing 30 weight percent ethyl ether, representing 0.33 mol of chloroacetaldehyde, and 90 grams (1 mol) of 1-butanethiol. This mixture was heated for 4 hours at a temperature in the range of 35 to 40° C. The heated mixture was then cooled and diluted with 4 volumes of water, and the diluted mixture was extracted with several portions of ether. The combined ether extracts, after drying over anhydrous magnesium sulfate, were found by gas chromatographic analysis to contain 61.6 grams of butyl disulfide, i.e., bis(n-butyl) disulfide, representing a yield of 69.2 mol percent based on the 1-butanethiol originally charged. Butyl disulfide, boiling point 78° C./2.0 mm. of Hg pressure, $n_D^{20}$ 1.4918, was isolated by distillation of the ether extract and characterized by comparison of the physical constants with those above stated of the known compound. Further characterization of the butyl disulfide isolated by distillation of the ether extract was achieved by comparison thereof with an authentic specimen of butyl disulfide by the use of both gas chromatographic analysis and infrared analysis. In both cases the results obtained from the butyl disulfide isolated by distillation of the ether extract were identical to those obtained from the authentic butyl disulfide specimen.

EXAMPLE II

A mixture of 250 ml. of methyl sulfoxide, 15.6 grams of 90 weight percent anhydrous chloroacetaldehyde containing 10 weight percent of ethyl ether, representing 0.18 mol of chloroacetaldehyde, and 40 grams (0.54 mol) of 2-propene-1-thiol was stirred at 35 to 40° C. for 4 hours. The reaction mixture was cooled and diluted with 2 volumes of water, and the diluted mixture was extracted with several portions of ether. The combined ether extracts, after drying over anhydrous magnesium sulfate, were found by gas chromatographic analysis to contain 19.0 grams of allyl disulfide, representing a yield of 48.2 mol percent based on the 2-propene-1-thiol charged. Allyl disulfide, boiling point 74° C./15 mm. of Hg pressure, $n_D^{20}$ 1.5303, was isolated by distillation of the ether extract and characterized by comparison of its physical constants with those of the known compound. The infrared spectrum of the allyl disulfide isolated by distillation of the ether extracts was identical to that of an authentic specimen of allyl disulfide.

EXAMPLE III

A mixture of 250 ml. of benzene, 37 grams of 70 weight percent anhydrous chloroacetaldehyde containing 30 weight percent ethyl ether, representing 0.33 mol of chloroacetaldehyde, and 90 grams (1.0 mol) of 1-butanethiol was stirred at approximately 35° C. for 4 hours. After the reaction mixture was cooled, it was washed with aqueous potassium carbonate and then with water. The washed benzene solution was dried over anhydrous magnesium sulfate and, after removal of the drying agent, the solvent was evaporated to give a residue. This residue was found by gas chromatography to contain only 2.7 grams of butyl disulfide, representing a 3 mol percent yield based on the 1-butanethiol employed.

Thus benzene is not a satisfactory substitute for methyl sulfoxide in the process of this invention.

EXAMPLE IV

A mixture of 250 ml. of ethyl ether, 37 grams of 70 weight percent anhydrous chloroacetaldehyde containing 30 weight percent ethyl ether, and 90 grams (1.0 mol) of 1-butanethiol was stirred at approximately 35° C. for 4 hours and then washed, dried and evaporated in the manner set forth in Example III. Analysis of the residue by gas chromatography showed it to contain only 2.9 grams of butyl disulfide, representing a 3 mol percent yield based on the 1-butanethiol employed.

Thus, ethyl ether is not a satisfactory substitute for methyl sulfoxide in the process of this invention.

EXAMPLE V

To 250 ml. of water was added 37.0 grams of anhydrous chloroacetaldehyde of 70 weight percent purity, containing 25.9 grams (0.33 mol) of the aldehyde, and 90 grams (1.0 mol) of 1-butanethiol. The mixture was stirred at approximately 35° C. for 4 hours after which it was cooled and extracted with ether. The ether extract was washed with aqueous potassium carbonate, then washed with water, and finally dried over anhydrous magnesium sulfate. After removal of the drying agent, the solvent was evaporated to give a residue which was found by gas chromatographic analysis to contain 0.7 gram of butyl disulfide, representing a 0.8 mol percent yield based on the 1-butanethiol employed.

Thus, water is not a satisfactory substitute for methyl sulfoxide in the process of the invention.

EXAMPLE VI

A mixture of 125 ml. of methyl sulfoxide, 55 ml. (0.5 mol) of 1-butanethiol, and 2 drops of concentrated hydrochloric acid was heated at 35 to 40° C. for 4 hours. The reaction mixture, after dilution with water, was extracted with ether, and the combined ether extracts were dried over anhydrous magnesium sulfate. The dried ether extract, after concentration on a steam bath, was found by gas chromatography to contain only 2.2 grams of butyl disulfide, representing a 5 mol percent yield based on the 1-butanethiol employed.

Thus, the desired disulfide was produced in an extremely low yield in the absence of chloroacetaldehyde.

Reasonable variations and modifications of this invention can be made, or followed, in view of the foregoing, without departing from the spirit or scope thereof.

I claim:

1. A method for preparing an organic disulfide of the formula RSSR, wherein R is defined below, comprising contacting a thiol of the formula RSH with a mixture of an alpha-halo aldehyde of the formula $XCR'_2CHO$ and an alkyl sulfoxide of the formula $R''_2SO$, where R is a monovalent hydrocarbon radical selected from the group consisting of alkyl, alkenyl, cycloalkyl, cycloalkenyl, aryl alkaryl, and aralkyl, containing up to and including 16 carbon atoms; R' is a member selected from the group consisting of hydrogen, alkyl radicals, cycloalkyl radicals, aryl radicals, alkaryl, and aralkyl, containing up to and including 8 carbon atoms; R'' is an alkyl radical selected from the group consisting of primary and secondary radicals which contains from 1 to 6 carbon atoms, inclusive; and X is a halogen, the molar ratio of said thiol to said alpha-halo aldehyde being in the range of from about 1:1 to about 10:1, the amount of alkyl sulfoxide being that effective to cause the production of the desired organic disulfide, and at an elevated reaction temperature, said temperature being sufficient to maintain the reactant substantially in the liquid phase.

2. A method for preparing butyl disulfide comprising oxidizing 1-butanethiol with a mixture of methyl sulfoxide and chloroacetaldehyde at a temperature in the range of from about 20 to about 100° C. and in a molar ratio of thiol to aldehyde in the range of from about 2:1 to about 6:1.

3. A method for forming allyl disulfide comprising oxidizing 2-propene-1-thiol with a mixture of methyl sulfoxide and chloroacetaldehyde at a temperature in the range of from about 20 to about 100° C., and with a molar ratio of thiol to aldehyde in the range of from about 2:1 to about 6:1.

References Cited

Reid: "Org. Chem. of Bivalent Sulfur," vol. 1, pp. 118–119 (1958).

CHARLES B. PARKER, *Primary Examiner.*

D. R. PHILLIPS, *Assistant Examiner.*